United States Patent
Lu (10) Patent No.: US 10,732,882 B2
(45) Date of Patent: Aug. 4, 2020

(54) TEMPORARY MEMORY PROCESSING METHOD, NON-TRANSITORY COMPUTER READABLE MEDIUM AND MEMORY DEVICE

(71) Applicant: REALTEK SEMICONDUCTOR CORP., Hsinchu (TW)

(72) Inventor: Yen-Ju Lu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/165,892

(22) Filed: Oct. 19, 2018

(65) Prior Publication Data
US 2019/0212938 A1    Jul. 11, 2019

(30) Foreign Application Priority Data
Jan. 10, 2018 (TW) .............................. 107100930 A (51) Int. Cl.
*G06F 3/06* (2006.01)
*G06F 12/0802* (2016.01)

(52) U.S. Cl.
CPC .......... *G06F 3/0646* (2013.01); *G06F 3/0604* (2013.01); *G06F 3/0673* (2013.01); *G06F 12/0802* (2013.01); *G06F 2212/60* (2013.01)

(58) Field of Classification Search
CPC .... G06F 3/0646; G06F 3/0673; G06F 3/0604; G06F 12/0802; G06F 12/0895; G06F 2212/60
See application file for complete search history.

(56) References Cited

U.S. PATENT DOCUMENTS

| 5,958,045 | A | * | 9/1999 | Pickett | G06F 9/30043 |
| | | | | | 711/118 |
| 7,197,605 | B2 | | 3/2007 | Schmisseur et al. | |
| 8,200,902 | B2 | | 6/2012 | Paver et al. | |
| 2015/0356019 | A1 | * | 12/2015 | Johar | G06F 12/0871 |
| | | | | | 711/142 |
| 2016/0055084 | A1 | * | 2/2016 | Rangaswami | G06F 16/176 |
| | | | | | 711/141 |
| 2017/0153977 | A1 | | 6/2017 | Yoo et al. | |

FOREIGN PATENT DOCUMENTS

TW         201743215 A      12/2017

* cited by examiner

*Primary Examiner* — Hiep T Nguyen
(74) *Attorney, Agent, or Firm* — Li & Cai Intellectual Property (USA) Office (57) ABSTRACT

The present invention provides a temporary memory processing method including: receiving a write command including a write data and a write address; determining whether a corresponding temporary address is in a missed state to generate a determined result; and determining whether to write the write data into a corresponding buffer address of a buffer memory according to the determined result.

9 Claims, 6 Drawing Sheets

TEMPORARY MEMORY PROCESSING METHOD, NON-TRANSITORY COMPUTER READABLE MEDIUM AND MEMORY DEVICE

CROSS-REFERENCE TO RELATED PATENT APPLICATION

This application claims the benefit of priority to Taiwan Patent Application No. 107100930, filed on Jan. 10, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE INVENTION

The present disclosure relates to a memory processing method, memory program and device, and more particularly to a memory processing method, memory program and device involving the process related to the temporary address being in a missed state.

BACKGROUND OF THE INVENTION

When existing memory devices are performing the function of writing in data or other programming commands, the devices would firstly search whether there is compatible command data in a temporary memory, and the devices would directly write data into the temporary memory if it appears to be affirmative. There are generally two ways to write data into temporary memories, i.e., write-through and write-back.

In write-through, the data will always be written into an external memory regardless of whether a missed state occurs. As for write-back write-allocate, the data will not be directly written into an external memory when the missed state occurs, but instead, the data stored in a corresponding write command address will be read in from an external memory and stored in a corresponding address of a temporary memory, and the content of the write command would then be stored in the address. However, in certain situations, the temporary memory may perform redundant external memory read-in actions.

Therefore, a temporary memory processing method and device that are capable of avoiding the redundant external memory read-in actions, reducing power consumption, and increasing the performance thereof is needed in the art.

SUMMARY OF THE INVENTION

Accordingly, with respect to the drawbacks associated with the current technology, the present disclosure provides a temporary memory processing method, temporary memory program and memory device to increase the performance of CPUs and to decrease the consumption of power.

The temporary memory processing method as disclosed includes the steps of receiving a write command including a write data and a write address, determining whether a corresponding temporary address is in a missed state to generate a determined result, and determining whether to write the write data into a corresponding buffer address of a buffer memory according to the determined result.

The memory device including a temporary memory as disclosed includes a buffer memory, a receiving unit, configured to receive a write command including a write data and a write address, a missed state determining unit, configured to determine whether a corresponding temporary address is in a missed state to generate a determined result, and a buffer control unit, configured to determine whether to write the write data into a corresponding buffer address of a buffer memory according to the determined result.

The temporary memory program as disclosed is run by loading the program into a computer. The temporary memory program includes receiving a write command including a write data and a write address, determining whether a corresponding temporary address is in a missed state to generate a determined result, and determining whether to write the write data into a corresponding buffer address of a buffer memory according to the determined result.

The effects of the present disclosure are, by the use of buffer memories and accumulating the write data of continuous addresses to process the missed states in the temporary memories, redundant read-in actions can be saved, and power consumption can be decreased so that the efficiencies of the memory devices are increased.

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of a memory processing method, memory program and device according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

Figure 1:
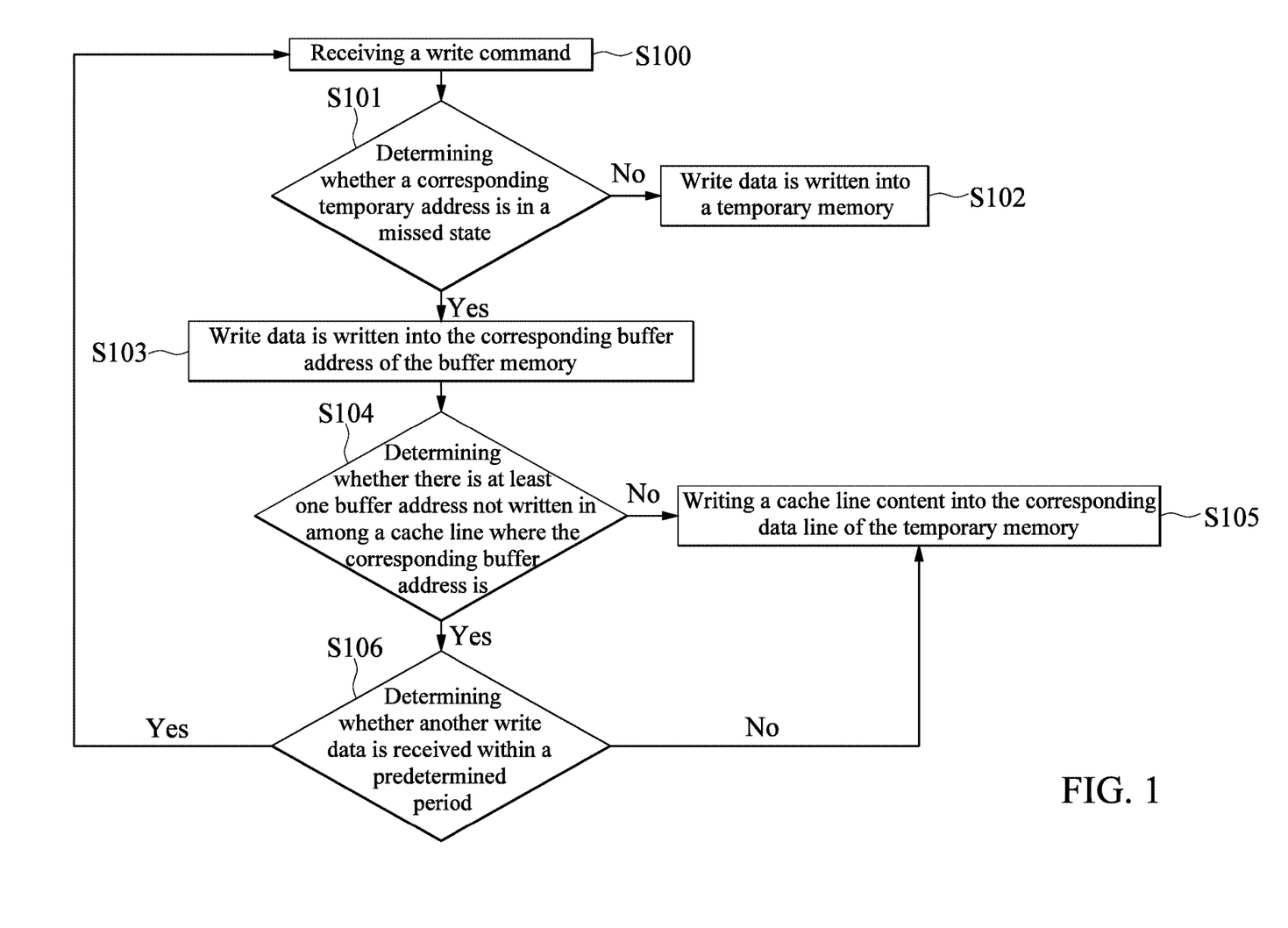
FIG. 1 is a flowchart of a temporary memory processing method according to an embodiment of the present disclosure.

Reference is made to FIG. 1, which is a flowchart of a temporary memory processing method according to an embodiment of the present disclosure. As shown in FIG. 1, the step of receiving a write command including a write data and a write address is performed in S100, and the step of determining whether a corresponding temporary address is in a missed state to generate a determined result is performed in S101. If the determined result indicates that the corresponding temporary address is not in a missed state, step S102 is performed, where the write data is written into a temporary memory. It should be noted that, the write data needs to be written into the temporary memory for both write-through and write-back approaches, whereas an extra procedure of writing into an external memory will be performed in the write-through approach. If the determined result indicates that the corresponding temporary address is in a missed state, step S103 will be performed in which the write data will be written into the corresponding buffer address of the buffer memory. Next, in step S104, it is determined whether there is at least one buffer address not written in among a cache line where the corresponding buffer address is, to generate a cache line status. When the cache line status indicates that all buffer addresses are written in, step S105 is performed to write a cache line content into the corresponding data line of the temporary memory. When the cache line status indicates that there is at least one buffer address not written in, step S106 will be performed to determine whether another write data is received within a predetermined period. If another write data is received within the predetermined period, the cache line content will not be written into the corresponding data line of a temporary memory, and the method would return to step S100 and proceed forward therefrom. If within the predetermined period another write data is not received, step S105 will be performed, in which the cache line content is written into the corresponding data line of a temporary memory. In other words, according to the temporary memory processing method of the present disclosure, whether the write command content is in the temporary memory will first be determined. If not, then the corresponding temporary address is determined to be in a missed state, and the write data will be written into the corresponding buffer address of the buffer memory. Otherwise, if the corresponding temporary address is not in a missed state, the write data will be written into the temporary memory. After writing the write data into the corresponding buffer address of the buffer memory, it is determined whether there is at least one buffer address not written in among a cache line where the corresponding buffer address is. When all the buffer addresses are written in, the cache line content will be written into the corresponding data line of the temporary memory. That is to say, by utilizing the write data of the buffer memory to process the missed state in the temporary memory and accumulating the written buffer addresses in the cache line, redundant read-in can be avoided. For example, the write data to be written in and an address to be written into the external memory are included in the write command to be executed, but if the temporary address corresponding to the address of the external memory is in the missed state, the data will be written into the corresponding buffer address.

The temporary memory processing method as shown in FIG. 1 can also be performed by a program. In one embodiment, the temporary memory processing method can be implemented by a temporary memory program installed in a memory device.

Figure 2:
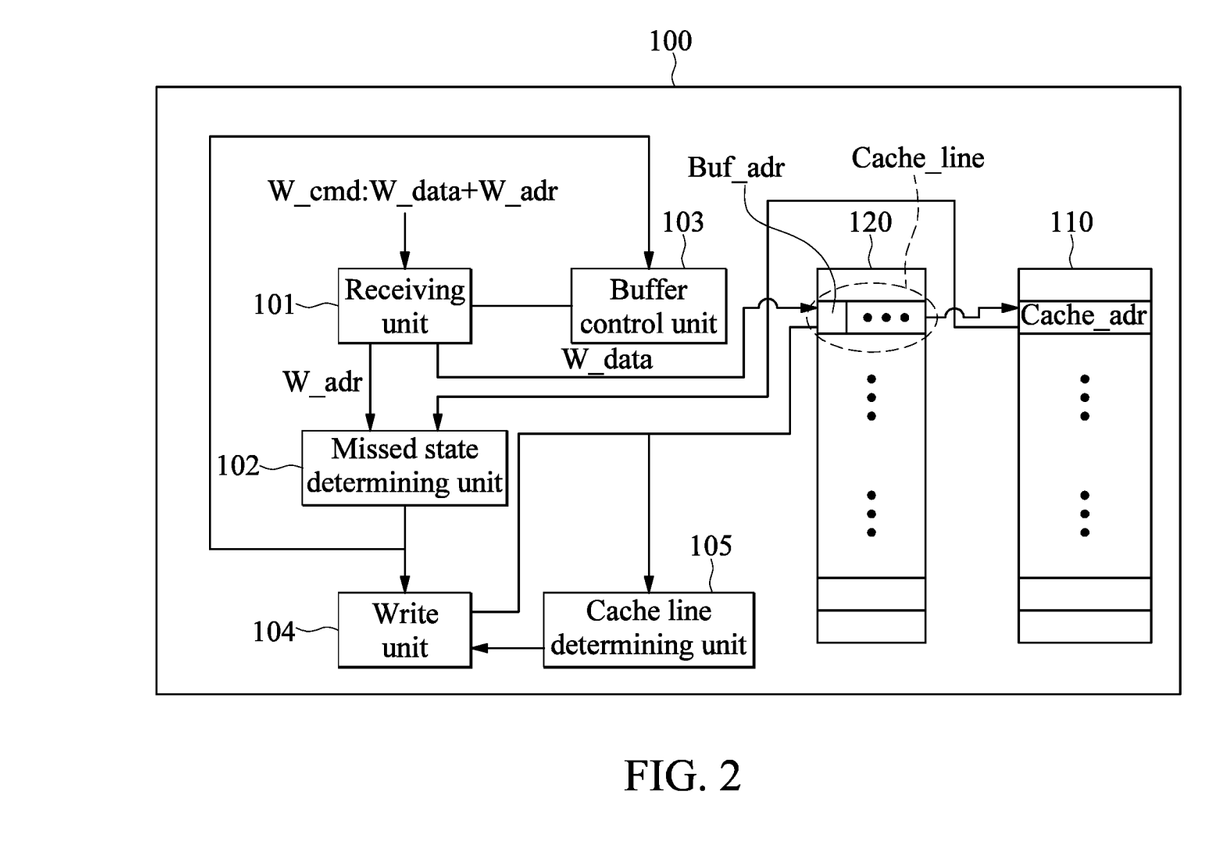
FIG. 2 is a schematic view illustrating the memory device according to an embodiment of the present disclosure.

Reference is next made to FIG. 2, which is a schematic view illustrating the memory device 100 according to an embodiment of the present disclosure.

The memory device 100 with a temporary memory 110 includes a buffer memory 120, a receiving unit 101 configured to receive a write command W_cmd including a write data W_data and a write address W_adr, a missed state determining unit 102 configured to determine whether a corresponding temporary address Cache_adr corresponding to the write address W_adr is in a missed state to generate a determined result, a buffer control unit 103 configured to determine whether to write the write data W_data into a corresponding buffer address Buf_adr of the buffer memory 120 according to the determined result, and a write unit 104 configured to write a cache line Cache_line where the corresponding buffer address Buf_adr is at into a corresponding data line D_line (not shown in the figure) of the temporary memory 110. When the temporary address is in the missed state, the write data will be written into the buffer memory. For example, the write data to be written in and an address to be written into the external memory are included in the write command to be executed, but if the temporary address corresponding to the address of the external memory is in the missed state, the data will be written into the corresponding buffer address.

In the present embodiment, when the determined result indicates that the corresponding temporary address Cache_adr is in the missed state, the buffer control unit 103 proceeds to write the write data W_data into the corresponding buffer address Buf_adr of the buffer memory 120. If the determined result indicates that the corresponding temporary address Cache_adr is not in the missed state, the buffer control unit 103 does not write the write data W_data into the corresponding buffer address Buf_adr of the buffer memory 120, but instead writes the write data W_data into the temporary memory.

In yet another embodiment, the memory device 100 further includes a cache line determining unit 105. The cache line determining unit 105 is configured to determine, among a cache line where the corresponding buffer address is, whether there is at least one buffer address not written in to generate a cache line status, so as to allow the write unit 104 to, according to the status of the cache line Cache_line, determine whether to write the write data W_data of the cache line Cache_line into a corresponding data line of a temporary memory 110. When the cache line status indicates that there is at least one buffer address not written in among the cache line Cache_line where the corresponding buffer address is, the receiving unit 101 determines whether another write command W_cmd is received within a predetermined period. When the receiving unit 101 determines that another write command W_cmd is received within the predetermined period, the cache line content will not be written into the corresponding data line D_line of a temporary memory 110, and when another write command is not received within the predetermined period, the cache line content will be written into the corresponding data line D_line of a temporary memory 110. When the cache line status indicates that all buffer addresses Buf_adr among the cache line Cache_line are written in, a cache line content will be written into the corresponding data line D_line of a temporary memory 110 by the write unit 104.

Figure 3:
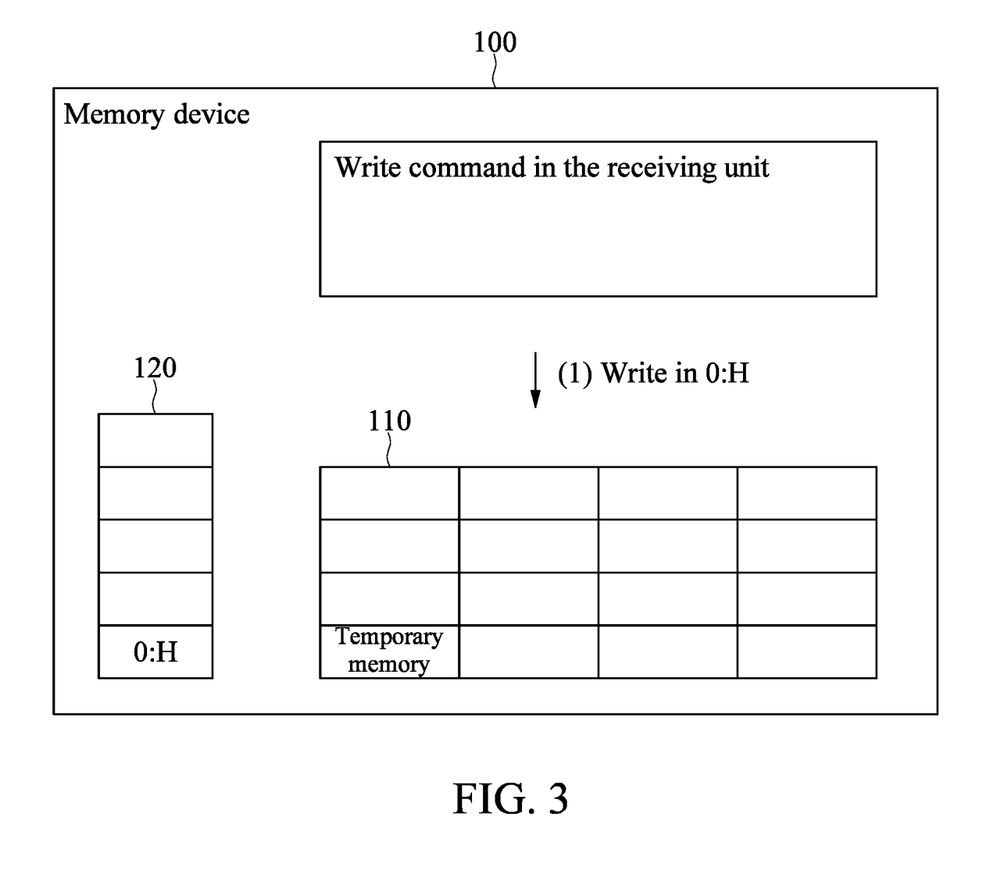
FIGS. 3-6 are schematic views illustrating the temporary memory processing method according to an embodiment of the present disclosure.
Figure 4:
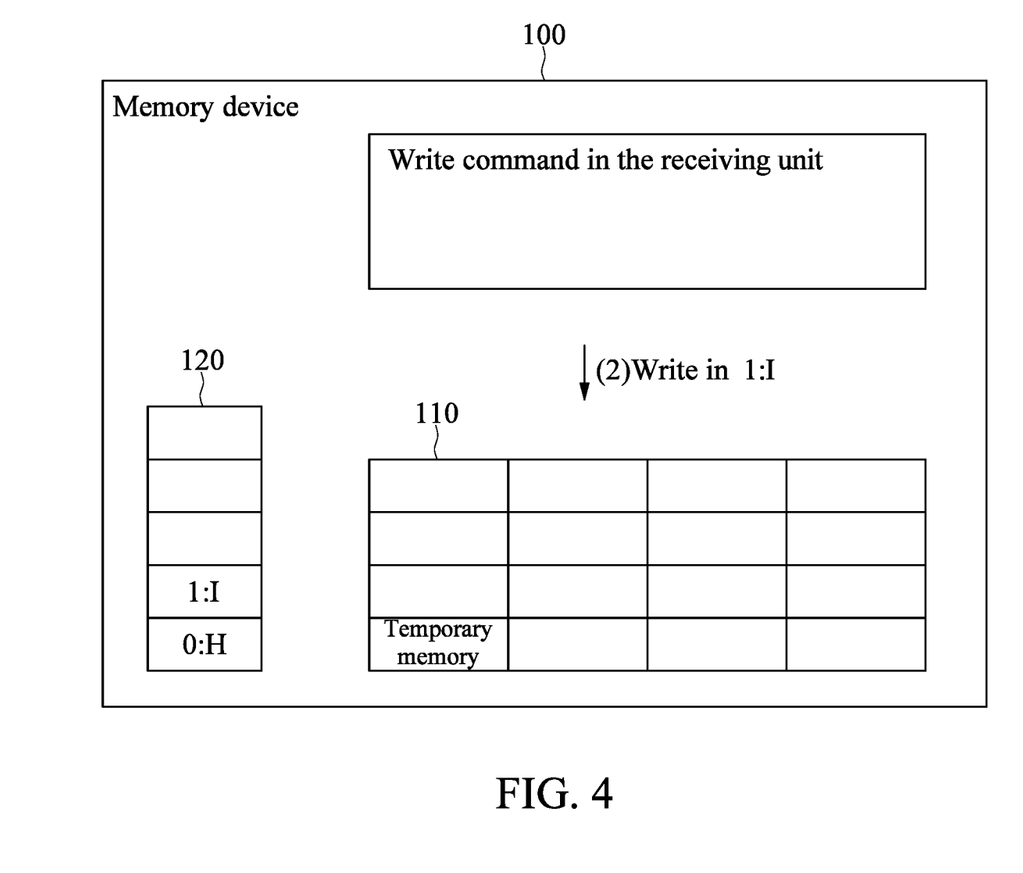
Figure 5:
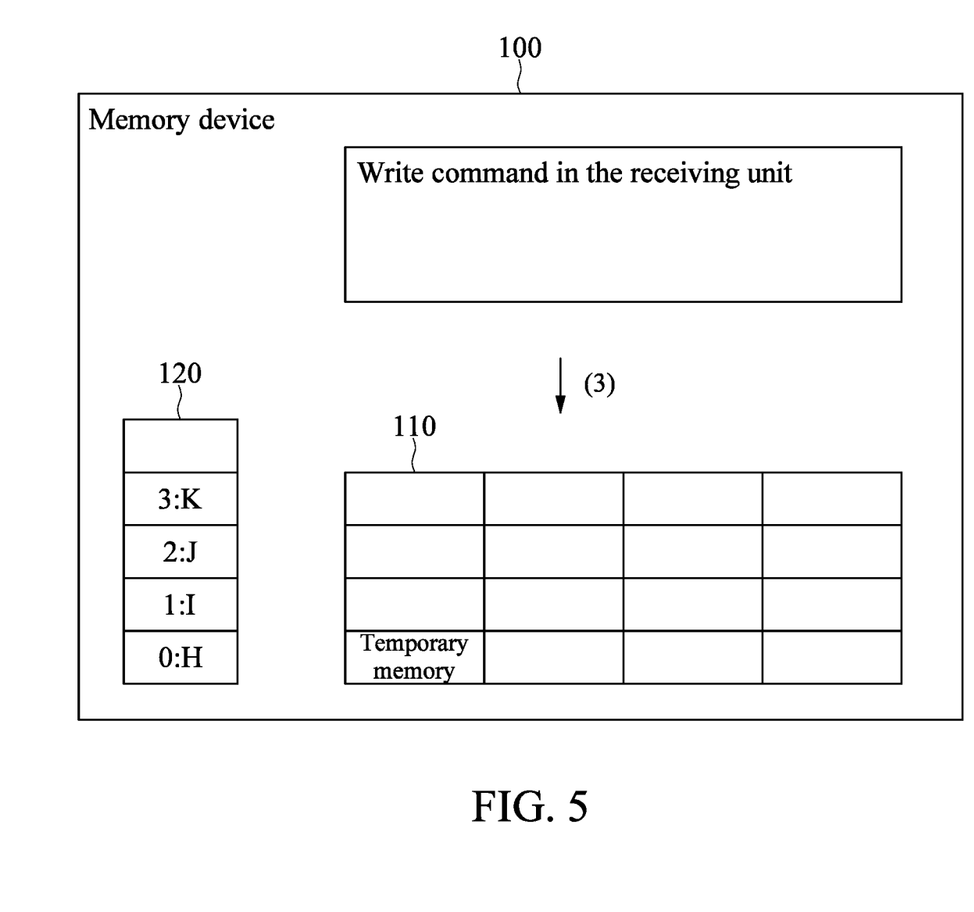
Figure 6:
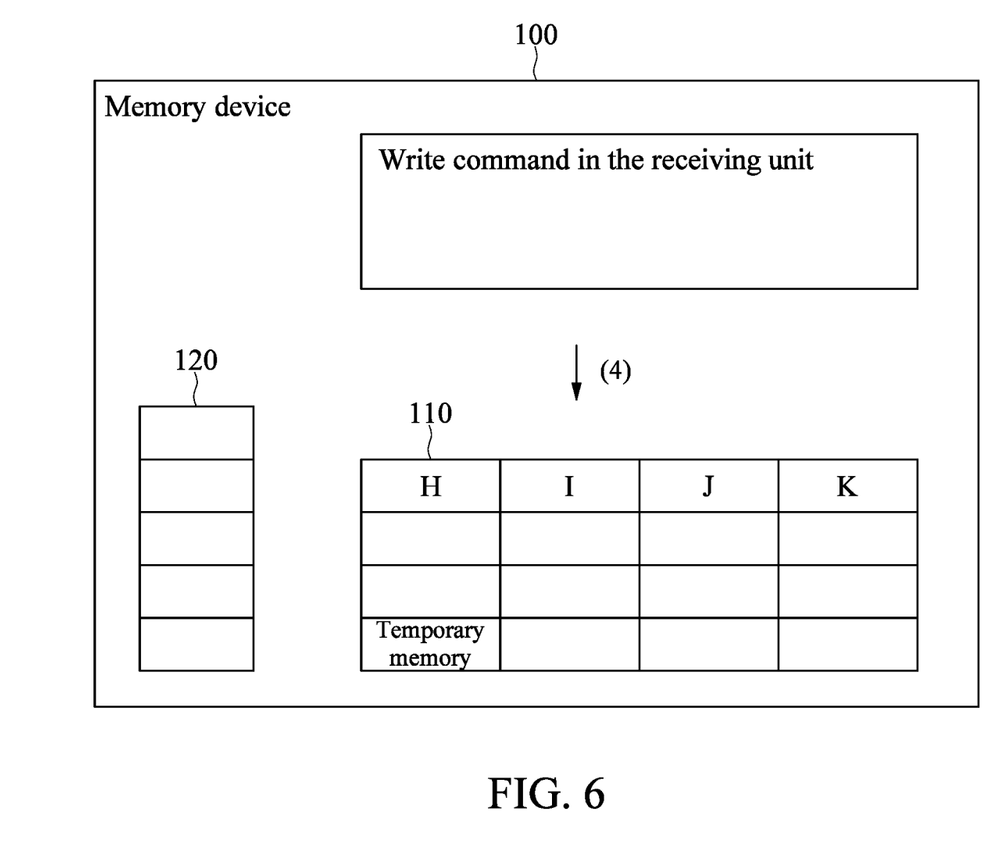

Reference is next made to FIGS. 3-6, which are schematic views illustrating the temporary memory processing method according to an embodiment of the present disclosure. FIGS. 3-6 illustrate an example of the above-mentioned embodiments. As shown in FIG. 3, in the write command to be executed, the write data W_data to be written in is "H," and the address to be written in the external memory is 0. As indicated in FIG. 3, the command is shown as "0:H," which means that the write data "H" is to be written into address 0 of the external memory (not shown in the figure). However, the temporary address Cache_adr corresponding to the command of writing "H" into address 0 is in the missed state, so that the command will be written into the corresponding buffer address Buf_adr. Similarly, in FIGS. 4 and 5, commands "1:I," "2:J" and "3:K" each stands for respectively writing "I," "J" and "K" into addresses 1, 2 and 3 of the external memory, where these commands are also in the missed state. Since addresses continuously adjacent to each other, they will all be written into the cache line Cache_line where the corresponding buffer address Buf_ader is at. As shown in FIG. 6, when the cache lines Cache_line are all stored with data, which means that when all the buffer addresses of the cache line Cache_line where the corresponding buffer address Buf_ader is at are written with data, or that, as in FIG. 5, only one remaining address has no data written in over a predetermined period, the contents of the cache line Cache_line will be collectively written into the temporary memory. That is to say, the cache line content will be written into the corresponding data line of the temporary memory.

In the conventional write-allocation approach, when the first missed write occurs, the entire cache line will be brought in from the external memory. However, the cache line will eventually be overwritten by subsequent writes, so that the act of bringing in the entire cache line is rendered redundant. One of the effects of the present disclosure is that, by using buffer memories to store missed write data, and writing the accumulated missed write data of the continuous addresses into the temporary memory to process the missed state of the temporary memory, redundant read-ins can be avoided, and power consumption can be lowered for increasing the performance of the memory device.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A processing method of a temporary memory, comprising:
   receiving a write command including a write data and a write address;
   determining whether there is a missed state in the temporary memory for the write address, and then generating a determined result; and
   determining whether to write the write data into a corresponding buffer address of a buffer memory according to the determined result;
   wherein when the determined result indicates that there is the missed state in the temporary memory for the write address, the write data will be written into the corresponding buffer address of the buffer memory, and the processing method further comprising:
   determining whether there is at least one buffer address not written in among a cache line where the corresponding buffer address is, to generate a cache line status; and
   determining, according to the cache line status, whether to write the write data of the cache line into a corresponding data line of the temporary memory.

2. The processing method of claim 1, wherein when the cache line status indicates that all buffer addresses are written in among the cache line where the corresponding buffer address is, a cache line content will be written into the corresponding data line of the temporary memory.

3. The processing method of claim 1, wherein when the cache line status indicates that there is at least one buffer address not written in among the cache line where the corresponding buffer address is, the following steps will be performed:
   determining whether another write data is received within a predetermined period;
   if another write data is received within the predetermined period, the cache line content is not written into the corresponding data line of the temporary memory; and
   if another write data is not received within the predetermined period, the cache line content is written into the corresponding data line of the temporary memory.

4. A memory device including a temporary memory, comprising:
   a buffer memory;
   a receiving unit, configured to receive a write command including a write data and a write address;
   a missed state determining unit, configured to determine whether there is a missed state in the temporary memory for the write address, and then generating a determined result; and
   a buffer control unit, configured to determine whether to write the write data into a corresponding buffer address of the buffer memory according to the determined result;
   wherein when the determined result indicates that there is the missed state in the temporary memory for the write address, the buffer control unit writes the write data into the corresponding buffer address of the buffer memory, and the memory device further comprising:
   a cache line determining unit, configured to determine whether there is at least one buffer address not written in among a cache line where the corresponding buffer address is, to generate a cache line status;
   wherein a write unit determines whether to write the write data of the cache line into a corresponding data line of the temporary memory.

5. The memory device of claim 4, wherein when the cache line status indicates that all buffer addresses are written in among the cache line where the corresponding buffer address is, a cache line content will be written into the corresponding data line of the temporary memory by the write unit.

6. The memory device of claim 4, wherein when the cache line status indicates that there is at least one buffer address not written in among the cache line where the corresponding buffer address is, the receiving unit determines whether another write command is received within a predetermined period; if the receiving unit determines that another write data is received within the predetermined period, the cache line content is not written into the corresponding data line of the temporary memory;
   and if the receiving unit determines that another write data is not received within the predetermined period, the cache line content is written into the corresponding data line of the temporary memory.

7. A non-transitory computer-readable medium storing a computer readable program, that when executed by a processing system causing the system to carry out a method, comprising:

receiving a write command including a write data and a write address;

determining whether there is a missed state in a temporary memory for the write address, and then generating a determined result; and determining whether to write the write data into a corresponding buffer address of a buffer memory according to the determined result;

wherein when determined result indicates that there is the missed state in the temporary memory for the write address, the write data will be written into the corresponding buffer address of the buffer memory, and the non-transitory computer-readable medium further comprising:

determining whether there is at least one buffer address not written in among a cache line where the corresponding buffer address is, to generate a cache line status; and determining, according to the cache line status, whether to write the write data of the cache line into a corresponding data line of the temporary memory.

8. The non-transitory computer-readable medium of claim 7, wherein when the cache line status indicates that all addresses are written in among the cache line where the corresponding buffer address is, a cache line content will be written into the corresponding data line of the temporary memory.

9. The non-transitory computer-readable medium of claim 7, wherein when the cache line status indicates that there is at least one buffer address not written in among the cache line where the corresponding buffer address is, the non-transitory computer-readable medium determines whether another write data is received within a predetermined period; if another write data is received within the predetermined period, the cache line content is not written into the corresponding data line of the temporary memory; and if another write data is not received within the predetermined period, the cache line content is written into the corresponding data line of the temporary memory.

* * * * *